Sept. 10, 1929.     V. P. RUMELY     1,727,446
VEHICLE ANCHORING DEVICE
Filed Feb. 20, 1925     2 Sheets-Sheet 1
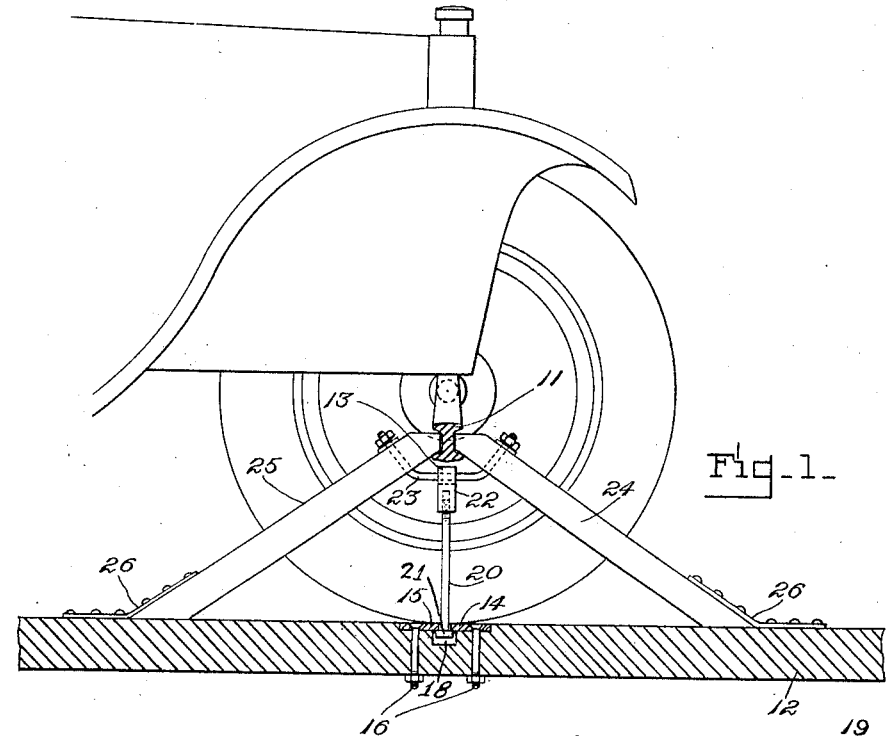
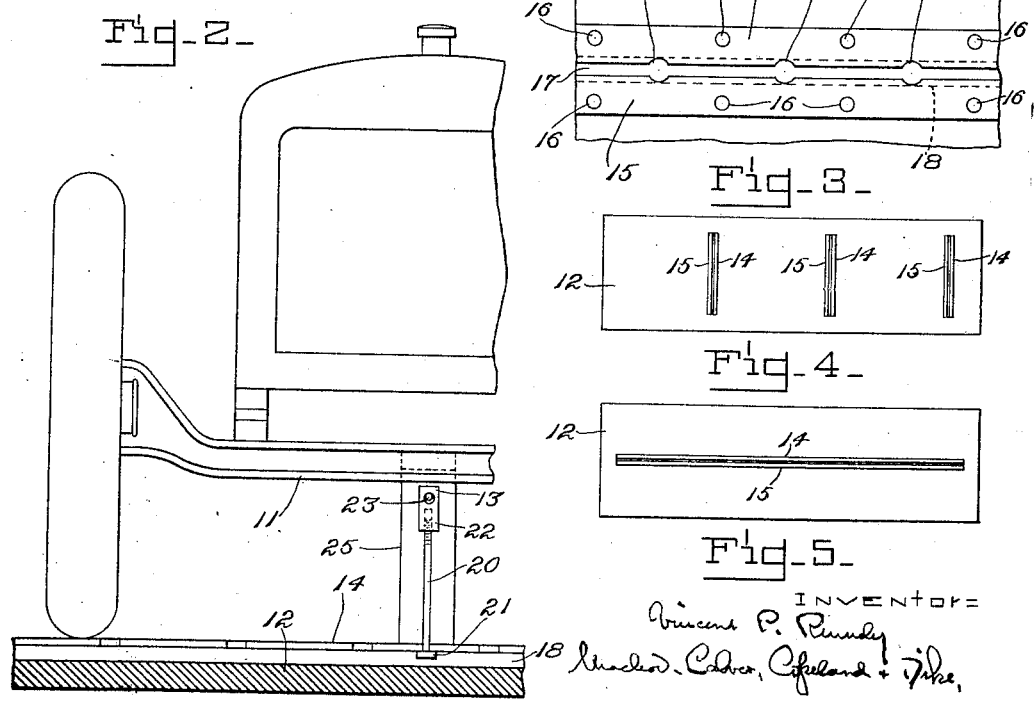
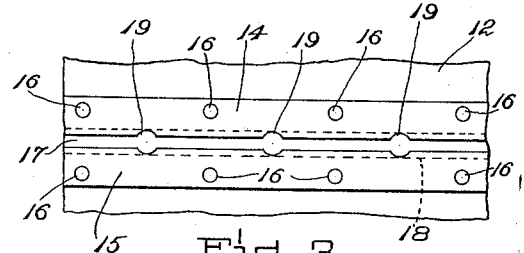
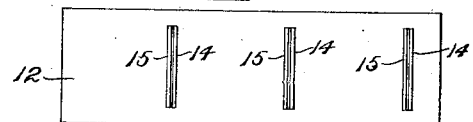
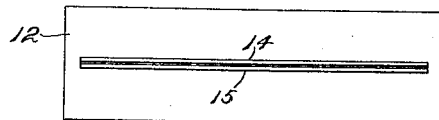

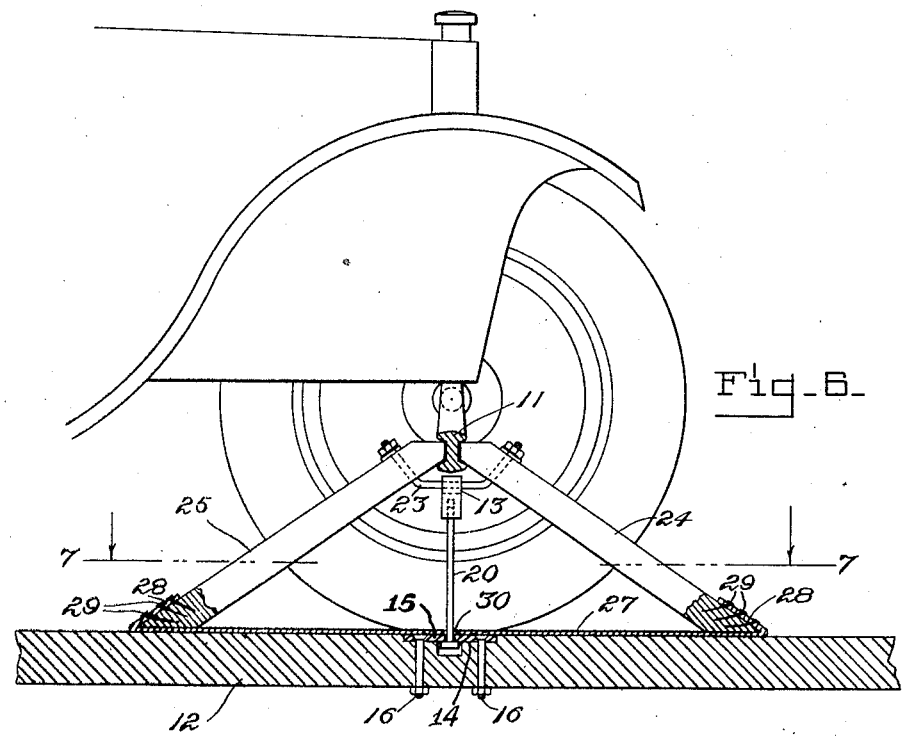
Fig-6-
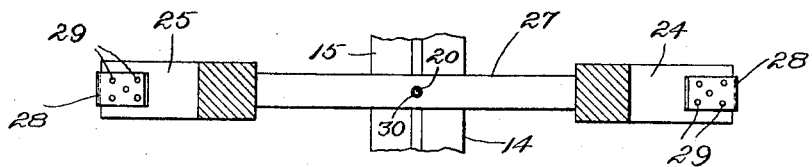
Fig-7-

Patented Sept. 10, 1929.

1,727,446

UNITED STATES PATENT OFFICE.

VINCENT P. RUMELY, OF DETROIT, MICHIGAN, ASSIGNOR TO HUDSON MOTOR CAR COMPANY, OF DETROIT, MICHIGAN, A CORPORATION OF MICHIGAN.

VEHICLE ANCHORING DEVICE.

Application filed February 20, 1925. Serial No. 10,474.

This invention relates to a combined brace and hold-down for securing vehicles in place in freight cars during transit, which device is adapted for use in freight cars provided with anchorage means in the floor of the type shown in a companion application filed January 30, 1925, Serial No. 5,813, patented November 27, 1928, No. 1,693,184. In the said companion application I have shown and described elongated means such as a metal strip or rail secured to the freight car floor to which is anchored a hold-down connecting the floor rod and the vehicle. This construction eliminates the necessity of nailing or spiking the hold-down to the wooden floor of the freight car, thereby preventing damage to the floor.

The present invention has for its object the combination of a brace, similar to that shown in my co-pending application brace for shipping vehicles in freight cars, Serial No. 741,828, filed October 6, 1924, and a hold-down of the type shown in my said companion application which is secured to anchorage means such as a rail, in the car floor. The combined brace and hold-down which forms the subject matter of the present application braces and holds the vehicle against forward and backward movement as well as vertical movement, the hold-down, which is anchored to the car floor, serving to maintain the parts of the brace firmly in engagement with the vehicle axle and through the medium of the brace restricting the vertical movement of the vehicle. The damage to the car floor which results from the spiking and nailing of the hold-down and brace to the wooden floor of the car is eliminated. Furthermore, the possibility of the device being torn loose from the car floor and causing severe damage to the vehicle is also removed.

The invention will be fully understood from the following description when taken in connection with the accompanying drawings, and the novel features thereof will be pointed out and clearly defined in the claims at the close of this specification.

In said drawings:

Fig. 1 is a diagrammatic view of the forward end of a motor vehicle showing my combined brace and hold-down applied to the front axle, the hold-down being secured to an anchorage in the car floor.

Fig. 2 is a fragmentary front view of the vehicle having the device attached.

Fig. 3 is a plan view of a portion of the anchorage in the car floor.

Figs. 4 and 5 are plan views of a freight car floor, the floor anchorage being shown transversely of the floor in Fig. 4 and lengthwise thereof in Fig. 5.

Fig. 6 is a side elevation, partly in section, of a modified construction of my device making the same a self contained unit.

Fig. 7 is a section taken substantially on the line 7—7, Fig. 6.

Referring to Fig. 1, at 11 is shown the I-beam front axle of a vehicle, the vehicle being anchored to the floor 12 of a freight car, the other parts of which are not shown, by means of my combined brace and hold-down. Two metallic strips or rails 14 and 15 (see Figs. 1, 2 and 3) are positioned in the car floor transversely of the car and are held in place by any suitable means such as the bolts 16. These strips or rails are spaced apart to provide the channel 17 and the car floor is also cut away beneath said strips or rails to provide the recess or groove 18. As shown in Fig. 4 the strips 14 and 15 are located at convenient places in the floor to be used with as many vehicles as are shipped in the car. It is also apparent that the strips 14 and 15 can be placed at as many points as desired throughout the length of the car to accommodate vehicles of different lengths. The strips 14 and 15 may also extend lengthwise of the car, as shown in Fig. 5, permitting the vehicle to be anchored thereto at any desired point. The strips 14 and 15 are provided with notches which form entrance openings 19 for the lower end of the hold-down appliance generally indicated as 13 which is attached to the vehicle and anchored to the strips 14 and 15. The openings 19 are located at convenient points a short distance apart throughout the length of the strips.

The hold-down appliance 13 may be of any convenient type and, as shown, consists of a bolt 20 provided with a head 21 which is of a size to permit its introduction into the openings 19 in the strips 14 and 15, and the shank of the bolt to be slid along the strips. The upper screw-threaded end of the bolt 20 is adapted to be received in a head member 22, which is connected to a tie-bolt 23 which forms a part of the brace portion of my device hereinafter described.

The brace shown in Figs. 1 and 2 consists of two normally separate, inclined members 24 and 25 which have their upper ends shaped to fit the channels or grooves on the opposite side of the I-beam front axle 11 of the vehicle. The tie-bolt 23 is passed through holes in the upper ends of the members 24 and 25 and serves to hold the said members in engagement with the axle 11. The lower ends of the members 24 and 25 may be secured to the floor of the car in any convenient manner, as by means of metallic plates 26 which form stops for the said inclined members.

When a vehicle is to be anchored to the freight car floor, it is moved to the desired point on the floor, the bolt 20 is introduced through one of the openings 19 between the floor strips 14 and 15 and moved to a convenient point beneath the axle of the vehicle. The inclined bracing members 24 and 25 are placed on opposite sides of the axle 11 and the tie-bolt 23 having the head 22 thereon is passed through the upper ends of the said inclined brace and bolted in place and the threaded end of the bolt 20 is screwed into the head 22. The metal strips or plates 26 are fastened to the ends of the bracing members and secured to the car floor. The bolt 20 may thereafter be turned sufficiently to draw the tie-bolt and the brace members 24 and 25 toward the car floor a sufficient amount to prevent any appreciable movement of the vehicle.

In Figs. 6 and 7 I have shown a slightly modified construction in which my combined brace and hold-down are a self-contained unit, the construction being such as to eliminate the necessity of securing the lower ends of the brace members 24 and 25 to the car floor. For this purpose I provide a member 27 which connects the lower ends of the members 24 and 25. The member 27 extends beneath the foot of each of the members 24 and 25 and is bent over to provide stops 28 to which the brace members 24 and 25 are fastened as by the nails 29. The connecting member 27 is further provided with an opening 30 through which the bolt 20 of the hold-down appliance 13 is passed. It is apparent that the device may be assembled before it is applied to the vehicle, it only being necessary to introduce the head 21 of the bolt 20 between the strips 14 and 15 in the car floor and to engage the upper ends of the inclined brace members 24 and 25 with the axle 11. The brace and hold-down can then be tightened by means of the tie-bolt 23 and the bolt 20 of the hold-down.

It will be understood that my present device may also be used on the rear axle of the vehicle. It is most convenient, however, to apply the brace to the front axle so that the ends of the inclined members 24 and 25 can be positioned in the channels of the I-beam.

What I claim is:

1. In combination, a freight car floor, means in said floor to which a vehicle may be anchored, a combination brace and hold-down for the vehicle, said hold-down being connected at one end to a part of said brace, the other end of said hold-down being insertable at a plurality of points in said floor anchorage means, and means for tightening said brace.

2. In combination, a freight car floor, means in said floor to which a vehicle may be anchored, a combination brace and hold-down for the vehicle, said brace comprising a pair of inclined members adapted to engage an axle of the vehicle at their upper ends and resting upon the car floor at their lower ends, a tie bolt extending between the upper ends of said members for tightening the same against said axle, said hold-down being connected at one end to said tie bolt at a point between the upper ends of said members, the other end of said hold-down being insertable at a plurality of points in said floor anchorage means.

3. In combination, a freight car floor, means in said floor to which a vehicle may be anchored, a combination brace and hold-down for the vehicle, said brace comprising a pair of inclined separate members adapted to engage an axle of the vehicle at their upper ends and resting upon the car floor at their lower ends, a tie bolt extending between and secured to the upper ends of said members for tightening the same against said axle, said hold-down being connected to said tie bolt at a point between and directly below the upper ends of said members.

In testimony whereof I affix my signature.

VINCENT P. RUMELY.